(12) United States Patent
Van Helleputte (10) Patent No.: US 11,343,975 B2
(45) Date of Patent: May 31, 2022

(54) POT FOR CULTURING AN EPIPHYTE AND EPIPHYTE POTTED THEREIN

(71) Applicant: THOMSEN SAS, Wormhout (FR)

(72) Inventor: Gino Van Helleputte, Melle (BE)

(73) Assignee: THOMSEN SAS, Wormhout (FR)

( * ) Notice: Subject to any disclaimer, the term of this patent is extended or adjusted under 35 U.S.C. 154(b) by 520 days.

(21) Appl. No.: 16/175,677

(22) Filed: Oct. 30, 2018

(65) Prior Publication Data
US 2020/0128759 A1    Apr. 30, 2020

(51) Int. Cl.
*A01G 9/02* (2018.01)
*A01G 22/63* (2018.01)

(52) U.S. Cl.
CPC ............. *A01G 9/021* (2013.01); *A01G 22/63* (2018.02)

(58) Field of Classification Search
None
See application file for complete search history.

(56) References Cited

U.S. PATENT DOCUMENTS

| | | | | |
|---|---|---|---|---|
| 1,775,831 A * | 9/1930 | Salisbury | ............... | A01G 9/021 47/65.5 |
| 2,881,939 A * | 4/1959 | Nelson | ............... | A01G 9/02 217/12 R |
| 4,173,097 A * | 11/1979 | Staby | ............... | A01G 9/021 47/65.5 |
| 4,635,394 A * | 1/1987 | Brown | ............... | A01G 9/02 47/39 |
| 4,739,581 A * | 4/1988 | Jarvis | ............... | A01G 9/04 47/71 |
| 4,753,037 A * | 6/1988 | Whitcomb | ............... | A01G 9/0295 47/73 |
| 5,168,664 A * | 12/1992 | Deutschmann, Sr. | ............... | A01G 27/008 47/59 R |
| 5,459,960 A * | 10/1995 | Manlove | ............... | A01G 24/60 47/65.5 |

(Continued)

FOREIGN PATENT DOCUMENTS

| | | |
|---|---|---|
| CN | 202285675 U | 7/2012 |
| CN | 203279559 U | 11/2013 |

(Continued)

OTHER PUBLICATIONS

NL-2019194-B1 Gino van Helleputte, Jan. 1, 2019 (Year: 2019).*

(Continued)

*Primary Examiner* — David J Parsley
*Assistant Examiner* — Morgan T Barlow
(74) *Attorney, Agent, or Firm* — Christensen O'Connor Johnson Kindness PLLC (57) ABSTRACT

The pot for culturing an epiphyte is integrally injection molded from a transparent plastic. The pot has a bottom, a lower edge, an upper edge and a sidewall extending between the lower edge and the upper edge. The sidewall of the pot is provided with an outwardly protruding lip at the level of the upper edge. A cross section through the sidewall of the pot, tangent to the lower face of the lip, has a substantially hexagonal or octagonal shape. Consequently, the pot, at least at the top, is hexagonal or octagonal, thus allowing more pots to be positioned per unit area compared to a round shape having the same diameter as the diameter of the circumscribed circle of the hexagonal or octagonal shape.

22 Claims, 3 Drawing Sheets

(56) References Cited

U.S. PATENT DOCUMENTS

| | | | | |
|---|---|---|---|---|
| 5,557,886 | A * | 9/1996 | Whitcomb | A01G 9/02 47/73 |
| 5,575,746 | A * | 11/1996 | Weder | A01G 9/02 425/387.1 |
| 6,055,773 | A * | 5/2000 | Yang | A01G 9/02 119/61.1 |
| 6,715,232 | B1 * | 4/2004 | Rice, III | A01G 9/02 47/39 |
| 7,797,880 | B1 * | 9/2010 | Kamau | A01G 27/02 47/66.6 |
| 9,521,815 | B2 * | 12/2016 | Panopoulos | A01G 9/02 |
| 2003/0106262 | A1 * | 6/2003 | Lai | A01G 27/02 47/65.6 |
| 2004/0144026 | A1 * | 7/2004 | Fan | A01G 9/02 47/65.5 |
| 2004/0148855 | A1 * | 8/2004 | Caron | A01G 9/02 47/80 |
| 2004/0211118 | A1 * | 10/2004 | Smith | A01G 9/021 47/66.5 |
| 2004/0216376 | A1 * | 11/2004 | Missry | A01G 9/02 47/66.6 |
| 2008/0016762 | A1 * | 1/2008 | Emalfarb | A01G 9/02 47/39 |
| 2008/0190022 | A1 * | 8/2008 | Whitcomb | A01G 9/0295 47/73 |
| 2008/0263942 | A1 * | 10/2008 | Hansen | B29C 51/325 47/65.5 |
| 2008/0276528 | A1 * | 11/2008 | Smith | A01G 9/021 47/66.7 |
| 2009/0077882 | A1 * | 3/2009 | Chen | A01G 9/02 47/71 |
| 2010/0154303 | A1 * | 6/2010 | Smith | A01G 9/021 47/66.7 |
| 2011/0000132 | A1 * | 1/2011 | Kamau | A01G 9/02 47/66.6 |
| 2013/0067810 | A1 * | 3/2013 | Kamau | A01G 9/022 47/66.6 |
| 2016/0212944 | A1 * | 7/2016 | Holby | A01G 9/02 |
| 2017/0295728 | A1 * | 10/2017 | Ryan | A01G 9/02 |
| 2017/0359977 | A1 * | 12/2017 | Contillo | A01G 27/06 |
| 2018/0125014 | A1 * | 5/2018 | Holby | A01G 9/02 |
| 2019/0335680 | A1 * | 11/2019 | Holby | A01G 9/021 |
| 2020/0245566 | A1 * | 8/2020 | Hung | A01G 9/021 |

FOREIGN PATENT DOCUMENTS

| | | | | |
|---|---|---|---|---|
| DE | 29812475 | U1 * | 11/1999 | B29C 51/32 |
| DE | 10012301 | A1 * | 9/2001 | A01G 9/02 |
| DE | 20114322 | U1 * | 6/2002 | A01G 9/021 |
| DE | 20119165 | U1 * | 3/2003 | A01G 9/021 |
| DE | 202008008356 | U1 * | 11/2009 | A01G 9/021 |
| EP | 0575298 | A1 * | 12/1993 | A01G 9/021 |
| EP | 1527676 | A2 * | 5/2005 | A01G 9/021 |
| EP | 2382861 | A1 * | 11/2011 | A01G 9/0291 |
| EP | 2499903 | A1 * | 9/2012 | A01G 9/021 |
| EP | 3342276 | A1 * | 7/2018 | A01G 7/00 |
| FR | 451250 | A * | 4/1913 | A01G 9/021 |
| FR | 2850834 | A1 * | 8/2004 | A01G 9/021 |
| FR | 2874479 | A1 * | 3/2006 | A01G 9/021 |
| FR | 2979797 | A1 * | 3/2013 | A01G 9/0291 |
| GB | 1069101 | A * | 5/1967 | A01G 9/02 |
| GB | 2458159 | A * | 9/2009 | A01G 9/042 |
| JP | S57171842 | U | 10/1982 | |
| JP | 2002000080 | A * | 1/2002 | A01G 9/024 |
| JP | 2016214177 | A | 12/2016 | |
| WO | WO-9500005 | A1 * | 1/1995 | A01G 9/02 |
| WO | WO-9823143 | A1 * | 6/1998 | A01G 9/021 |
| WO | WO-03045129 | A1 * | 6/2003 | A01G 9/021 |
| WO | WO-2004006651 | A1 * | 1/2004 | A01G 9/04 |
| WO | WO-2008098724 | A1 * | 8/2008 | A01G 9/02 |
| WO | WO-2017150510 | A1 * | 9/2017 | A01G 27/00 |
| WO | WO-2018006123 | A1 * | 1/2018 | A01G 9/021 |

OTHER PUBLICATIONS

Search Report and Written Opinion dated Feb. 21, 2018, in corresponding Dutch Application No. NL 2019194, filed Jul. 6, 2017, 9 pages.

* cited by examiner

POT FOR CULTURING AN EPIPHYTE AND EPIPHYTE POTTED THEREIN

BACKGROUND

Epiphytes are plants that grow on other plants without taking nutrients from them. They usually grow in tropical areas where they not only receive the required heat, but also regular (almost daily) rain showers. Their roots are thus subject to cyclic periods of saturation and dehydration. Commercially important, pot-grown epiphytes are orchids belonging to the Orchidaceae family. The genera *Phalaenopsis, Miltoniopsis* and *Cattleya*, among others, also belong to this family.

In practice, an orchid is cultured for a considerable amount of time in a greenhouse in a pot, which can take up half a year to one year and a half After the young plants, which have for instance been obtained by meristem cultivation, have been transplanted into the definitive pots, the initial cultivation of the young plants takes, for instance, about 30 weeks, after which the further development of the plants can take another 40 weeks. In a first phase after potting, the temperature in the greenhouse should be relatively high, namely about 28° C. For the second phase of the cultivation, the pots should then be transferred to another part of the greenhouse in which the temperature is maintained at about 17 to 18° C. During this second phase, the development of the branches takes place. The third phase, being the final cultivation of the orchids, then takes place in a greenhouse at a temperature of about 23° C. to draw the orchids into bloom.

In the first phase of the cultivation, the pots are placed against each other to be able to fit as many plants per unit area as possible. In the second phase, the pots are further apart to give the plants a sufficient amount of light and to prevent their roots from growing together. In the third phase, the pots are also further apart, but the pots are often placed into a vase, or provided with a collar that extends above the pot to prevent the plants from growing together with their aerial roots.

The use of a collar during the third phase of the cultivation of orchids is for instance described in NL-C-1031049, while the use of a vase for this phase is described in NL-C-2002081. The vase described in the latter patent is hexagonal over its entire height, so that gaps between the vases can be avoided. The vases have a height that is about twice as high as the height of the plant pot placed therein.

After the final cultivation of the plants, the vases or the collars are removed, so that for transport of the plants, the pots can again be placed against each other. The pots can for instance be placed in trays having two rows of five pots therein. On the so-called Danish trolleys which are usually used for transport, six of such trays can then be placed on each platform, being sixty pots in total.

The pots that are used in practice for the initial cultivation of orchids are transparent, round pots. Due to the pots being transparent, not only the roots coming out of the pot, but also part of the roots that are inside the pot receive light. The growth of these roots is favorably influenced by the light they receive. The round shape of the pots offers the advantage that compression of the pot when taking hold of it is maximally avoided. A pot having a round shape is, in other words, sturdier than for instance a square pot.

Before the young plants are planted in the round pots, they are cultured in trays or in small pots. In WO 2015/181278, small square pots are described of which only the bottom portion is filled with culture substrate, and of which the upper portion forms a collar intended to prevent the aerial roots from growing together. Due the small pots being square, they can be placed against each other without gaps. A disadvantage of square small pots is, however, that when the roots grown into a corner of the small pots, the roots must change direction, wherein it was found that a significant number of the roots bend upwards instead of turning sideways. To prevent the aerial roots from growing out of the small pot, in spite of the presence of the relatively high collar portion, said collar portion of the small pot according to WO 2015/181278 is provided with inwardly protruding lips. The small pots themselves consist of two halves, so that the young plants with the substrate hanging therefrom can easily be removed from the small pots and in transferred into the final pot.

However, a disadvantage of round pots is that when positioning the pots against each other a gap is always left open between the pots. In particular during the first phase of the cultivation of the plants, when the temperature in the greenhouse should be kept the highest, it is therefore not possible to place the pots closer together and thus allow more plants to be cultured per unit area. A further disadvantage of the round pots is they are also placed against each other during transport, so that during transport empty gaps are left between the pots as well.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present disclosure relates to a pot for culturing an epiphyte, in particular an orchid, wherein said pot is integrally injection molded from a transparent plastic and has a bottom, a lower edge arranged to be supported on a base surface, an upper edge and a sidewall extending between the lower edge and the upper edge, wherein the bottom connects with the sidewall. At the level of the sidewall of the pot, said upper edge is provided with an outwardly protruding lip. The pot further has a height, measured between said lower edge and said upper edge in a direction perpendicular to said base surface, and a maximum long diagonal, wherein the height of the pot is at most 20%, preferably at most 15% and more preferably at most 10% larger than the maximum long diagonal of the pot. It is, in other words, a transparent pot filled with a substrate in which the epiphyte is planted, and not a vase in which such a pot, for instance in a later phase of the cultivation, is placed to prevent the leaves, and especially the aerial roots of adjacent epiphytes from growing together.

The disclosure aims to provide a novel pot for culturing an epiphyte which, compared to a round pot having the same diameter as the circumscribed circle of the novel pot, allows more pots per unit area to be arranged in the greenhouse during the first phase of the cultivation of the epiphyte, and which also during transport allows more pots to be placed onto a same trolley, or in other words allows more pots to be transported per unit area.

To this end, the pot according to the disclosure is characterized in that an upper cross section through the sidewall of the pot, according to a first cross-sectional plane parallel to said base surface and tangent to the lower face of said protruding lip, has a substantially hexagonal or octagonal shape.

Because the pot is injection molded, and thus needs to be able to be demolded, an upper cross section of the pot is always larger than the bottom of the pot. The pot according to the disclosure is, at least at the top, hexagonal or octagonal, thus allowing more pots to be placed per unit area compared to a round shape having the same diameter as the diameter of the circumscribed circle of the hexagonal or octagonal shape, both during the first phase of the cultivation and during transport. This is achieved in particular by the fact that both with a hexagonal and with an octagonal shape, less gap space is left between adjacent pots compared to a round shape.

Moreover, opting for a hexagonal or octagonal shape instead of a square shape leads to the corners being less acute. This reduces the tendency of roots to grow out of the pot at the top. A hexagonal or octagonal pot also fits better into a round cache-pot, also known as an overpot, so that using a hexagonal or octagonal pot, compared to a square pot, a pot with a larger volume can be placed into the cache-pot, naturally allowing a larger volume of substrate to be provided for the epiphyte.

In an embodiment of the pot according to the disclosure, the upper cross section has a substantially hexagonal shape.

A hexagonal shape offers the advantage that no surface area is lost between adjacent hexagons. In particular, it allows a tiling to be formed with hexagonal shapes wherein no surface area is present between adjacent pots. This is not the case with an octagonal shape, as with four adjacent octagonal shapes, a square gap is left open centrally between four adjacent octagonal shapes. Thus, a hexagonal shape allows a higher number of pots to be placed per unit area, compared to an octagonal shape having a circumscribed circle with a same diameter.

In another embodiment of the pot according to the disclosure, the upper cross section has six vertices, determined for each of the six corners by the point furthest from the opposite corner, and these six vertices determine a hexagon. This hexagon has a first surface area, and the upper cross section through the pot has a second surface area that is preferably at most 9%, more preferably at most 7%, even more preferably at most 5% and most preferably at most 3% larger than said first surface area.

The hexagonal shape of the upper cross section of the pot can thus slightly differ from the hexagon determined by the vertices, wherein a small difference of for instance at least 1 or 2% is suitable, to thus create a positive strain onto the sides of the hexagonal cross section. This positive strain ensures that the hexagonal shape can be less easily compressed when taking hold of the pot.

The hexagon formed by the vertices of the upper cross section is preferably substantially regular, wherein the sides of said hexagon each have a length that differs at most 5%, preferably at most 4%, more preferably at most 3% and most preferably at most 2% from the average lengths of the six sides.

Due to the hexagon being substantially regular, no specific orientation of it needs to be kept in mind when positioning the pot.

Optionally, however, the hexagon formed by the vertices of the upper cross section can also be substantially elongated, wherein two pairs of opposing sides of said hexagon each have a length that differs at most 5%, preferably at most 4%, more preferably at most 3% and most preferably at most 2% from the average lengths of these two pairs of opposing sides, wherein the third pair of opposing sides have an average length that is longer than the average length of said two pairs of opposing sides, and wherein each of the sides of said third pair of opposing sides has a length that differs at most 5%, preferably at most 4%, more preferably at most 3% and most preferably at most 2% from the average length of the third pair of opposing sides.

Such an elongated hexagonal shape offers the advantage that the epiphyte can be planted with its opposing leaves in the lengthwise direction of the elongated hexagon, allowing the plants to be placed closer together laterally.

However, due to the smaller volume of the pot that can thus be placed in a round cache-pot, in some embodiments, the elongated hexagon is not too elongated and the average length of the sides of said third pair of opposing sides is at most 30%, preferably at most 20% longer than the average length of the sides of said two pairs of opposing sides.

In another embodiment of the pot according to the disclosure, a lower cross section through the sidewall, according to a second cross-sectional plane parallel to said base surface and tangent to the upper face of the joining of the bottom to the sidewall, has a substantially round shape.

This embodiment is especially advantageous for a number of reasons. First, the possibility exists that, as described above, roots will start growing in another direction upon reaching a corner in the sidewall. When a round shape is provided at the joining of the bottom and the sidewall, this also means that there are no corners to be encountered by the roots. The roots can therefore grow unencumbered and thus will continue to grow in the bottom half of the pot. Thus, due to the pot being round at the bottom, fewer roots will grow out of the pot.

In another embodiment, the round shape also offers the advantage that the pot can be gripped more sturdily at the bottom. It is also advantageous to use a round shape because it is less likely to snag when being moved over a conveyor belt in the greenery, in other words, the round shape ensures a smoother passage of the pot through the automated transport system in the greenery. Furthermore, the orientation of the pot is irrelevant when using a round shape, whereas it is to be taken into consideration when using an angular shape. Hence, when using a round shape, it is not necessary to provide the transport system in the greenery with orientation preserving means to ensure that the pots are correctly oriented.

In another embodiment, the smallest circle encircling said lower cross section has a third surface area, and said lower cross section has a fourth surface area that is at most 5%, preferably at most 4%, more preferably at most 3%, even more preferably at most 2% and most preferably at most 1% smaller than said third surface area.

The lower cross section thus has a shape that is a good approximation of a circle shape.

In an embodiment of the pot according to the disclosure, the shape of the cross sections of said sidewall, according to cross-sectional planes located one below the other parallel to said base surface, continuously transitions, over the majority of the distance between the first and the second cross-sectional plane, from said substantially hexagonal or octagonal shape to said substantially round shape. Preferably, the shape of the cross section of said sidewall continuously transitions over at least 70%, preferably over at least 80% and more preferably over at least 90% of the distance between the first and the second cross-sectional plane, from said substantially hexagonal or octagonal shape to said substantially round shape.

The continuous transition, i.e. the transition without sudden jumps, allows the volume of the pot to be kept as large as possible and also, simultaneously, allows the sturdiness of the lower part of the pot to be kept as high as possible.

In some embodiments, the shape of said cross sections of the sidewall continuously transitions from said substantially hexagonal or octagonal shape to said substantially round shape due to said cross sections having curved sides with a curvature that increases toward said lower cross section.

In some embodiments, the sides of the cross sections of the sidewall elk substantially constitute an arc of a circle having a radius of curvature that decreases toward said lower cross section.

In some embodiments, said cross sections have rounded corners. More preferably, said rounded corners are rounded according to an arc of a circle having a radius of curvature that is substantially constant, wherein the length of said circle arcs decreases toward the lower cross section.

In some embodiments, said cross sections have curved sides and the circle arcs of the rounded corners have ends that are aligned with the adjoining ends of the curved sides of said cross sections. In this way, a continuous transition between the rounded corners and the curved sides is achieved, causing the hexagonal shape still present in the lower part of the pot to be less noticeable.

In some embodiments, said curved sides substantially form an arc of a circle having a radius of curvature that preferably decreases continuously toward said lower cross section.

In an embodiment of the pot according to the disclosure, the pot has a long diagonal that decreases linearly from said upper cross section down to a distance of at most 10% of the height of the pot above said lower cross section. Thus, the sidewall of the pot, contrary to many other pots, forms no collar between said upper cross section and a cross section located at 10% of the height of the pot above said lower cross section.

In most existing pots, the collar provides extra sturdiness against compression of the pot. In the pot according to the disclosure, however, it can be omitted, to thus retain a maximal volume of the pot.

In an embodiment of the pot according to the disclosure, the pot is provided at the bottom with a foot that extends vertically and transitions by way of a collar into the inclined sidewall. This collar can then serve to support the foot of a pot nested therein, to thus prevent nested pots to become stuck.

The disclosure further relates to a potted epiphyte, in particular a potted orchid, which is planted in a pot having a growing substrate therein. The potted epiphyte is characterized in that said pot is constituted by a pot according to the disclosure.

Further advantages and particularities of the disclosure will become clear from the following description of the embodiments of a pot for culturing an epiphyte. This description is, however, only given by way of example, and is not intended to limit the scope of protection as defined by the claims.

DESCRIPTION OF THE DRAWINGS

The foregoing aspects and many of the attendant advantages of the present disclosure will become more readily appreciated as the same become better understood by reference to the following detailed description, when taken in conjunction with the accompanying drawings, wherein.

DETAILED DESCRIPTION

The detailed description set forth below in connection with the appended drawings, where like numerals reference like elements, are intended as a description of various embodiments of the present disclosure and are not intended to represent the only embodiments. Each embodiment described in this disclosure is provided merely as an example or illustration and should not be construed as precluding other embodiments. The illustrative examples provided herein are not intended to be exhaustive or to limit the disclosure to the precise forms disclosed.

In the following description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may include references to directions, such as "forward," "rearward," "front," "rear," "upward," "downward," "top," "bottom," "right hand," "left hand," "lateral," "medial," "in," "out," "extended," etc. These references, and other similar references in the present application, are only to assist in helping describe and to understand the particular embodiment and are not intended to limit the present disclosure to these directions or locations.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number.

The disclosure relates to a pot intended for potting the epiphyte and an epiphyte potted therein. In particular, the epiphyte is an orchid, or in other words belongs to the orchids family (Orchidaceae). Commercially important genera of orchids are the genus *Phalaenopsis*, the genus *Miltoniopsis* and the genus *Cattleya*.

In practice, orchids are usually grown from tissue culture material, i.e. from plant material cultured on an artificial nutrient substrate, for instance from plant meristems (meristem culture). Other augmentation techniques, such as augmentation by seed or by cuttings, may also be employed if possible. After the tissue culture material has sufficiently developed into a small plant with leaves and roots, this material is planted into a culture substrate. This culture substrate is preferably provided with fine pores for a good root development of the tissue culture material. Culture substrates based on peat, coconut peat or other organic materials are eligible for such use. Culture substrates may also contain inorganic materials, such as rock wool, or plastic materials such as polyurethane foam. An often-used culture substrate that is particularly suited for the cultivation of young plants from tissue culture material is sphagnum.

The young plants are for instance cultured in cubes. These cubes contain the culture substrate. The culture substrate can be held together in these cubes in different ways, in particular by means of a basket, by means of glue, by compressing the culture substrate (compressed cubes), by the roots of the young plant itself (grown in a small pot from which the young plant is removed together with the culture substrate hanging from it) or by a combination of these. In so-called cutting baskets, the young plants are for instance placed between two half cubes in a cylindrical basket, after which these half cubes are moistened, causing them to swell and become stuck in the basket. Especially advantageous is the use of so-called glue plugs, i.e. plugs (cubes) in which the culture substrate is held together by glue.

The advantage of the use of cubes (plugs) is that the young plants can be sorted according to size before being supplied to the plant breeder. This sorting can be carried out automatically. A further advantage is that the potting of the young plants can also be automated. The young plants can easily be taken by their root cube by mechanical means and placed into the pot in the desired position.

The pot in which the young plant is planted, is not filled with the culture substrate but with a growing substrate. This growing substrate usually consists of coarser particles and thus also has coarser pores than the culture substrate. The growing substrate is preferably a loose, coarse-grained substrate. This substrate preferably consists for at least 80 wt. %, most preferably for at least 90 wt. %, of particles that are larger than 5 mm, i.e. of particles retained by a 5 mm sieve. Preferably, the substrate consists at least for 95 wt. % of particles larger than or equal to 7 mm. These particles have a sufficient hardness for them to virtually not be compressed in the pot. In practice, for instance, ground wood bark, i.e. so-called bark substrate, has proven advantageous for growing orchids. Of this ground wood bark, a fraction of for instance 7-12 mm is then used, or a fraction of 12-18 mm, depending on the growth stage of the plant. Optionally, other materials, such as for instance sphagnum, can be added to the wood bark. Such sphagnum is filiform and thus finer than the tree bark. The advantage of a filiform finer material is that such material remains homogenously distributed between the coarser material and thus will not create a more compact layer at the bottom of the pot.

When growing orchids, the potted plants are placed onto a grid with a heating system provided underneath. The grid is for instance constituted by a mesh, while the heating system consists of heating tubes. The hot air rising beneath the pots causes the coarse-grained growing substrate in the pots to quickly dry up after every watering.

As described above, the growing of orchids takes place in multiple phases. In a first phase after potting, the temperature in the greenhouse should be relatively high, namely about 28° C. For the second phase of the cultivation, the pots should then be transferred to another part of the greenhouse in which the temperature is maintained at about 17 to 18° C. During this second phase, the development of the branches takes place. The third phase, being the final cultivation of the orchids, then takes place in a greenhouse at a temperature of about 23° C. to draw the orchids into bloom. After this, the orchids need to be transported to the retailers, for which typically Danish trolleys are used.

As indicated above the object of the disclosure is to provide a novel pot for culturing an epiphyte which, compared to a round pot having the same diameter as the circumscribed circle of the novel pot, allows more pots per unit area to be arranged in the greenhouse during the first phase of the cultivation of the epiphyte, and which also during transport allows more pots to be placed onto a same trolley.

Figure 1:
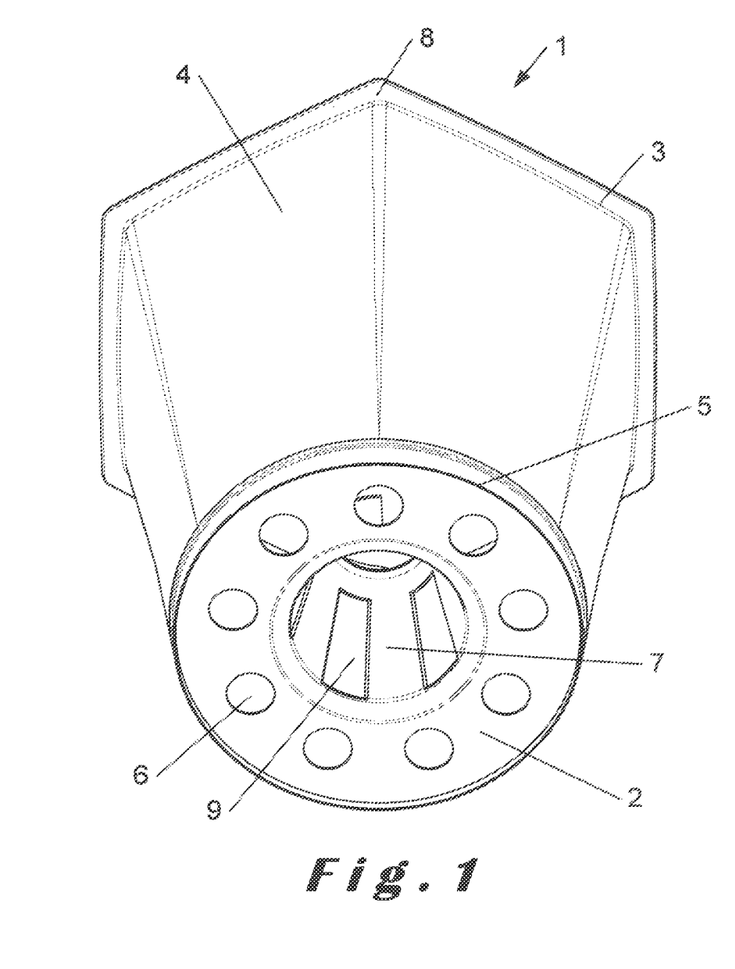
FIG. 1 shows a perspective view from below onto a pot according to the disclosure.
Figure 5:
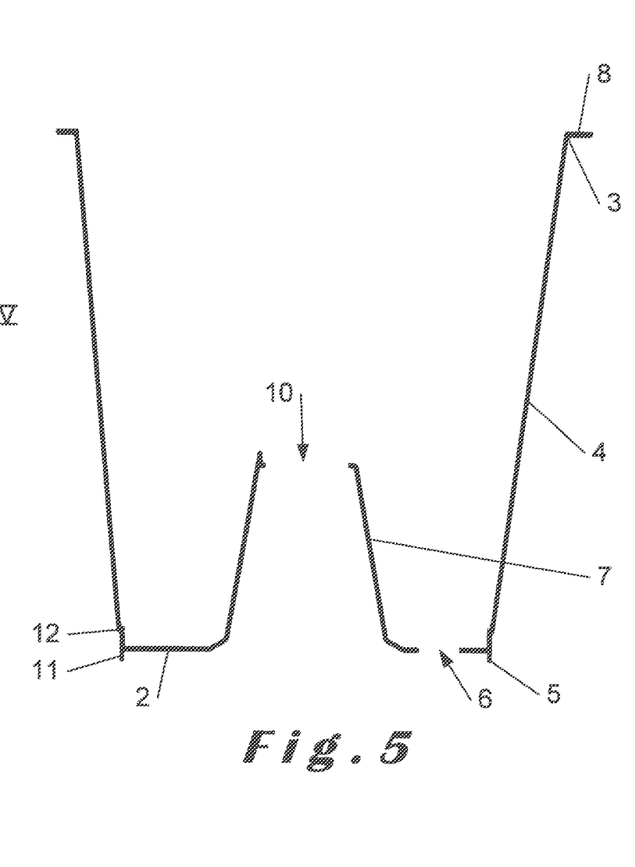
FIG. 5 shows a cross section along the line V indicated in FIG. 4.

An embodiment of a pot according to the disclosure is shown in the figures. As shown in FIG. 1, the pot 1 mainly consists of a bottom 2 joining a sidewall 4 that extends up to the upper edge 3 of the pot 1. Located beneath the bottom 2 is a protruding lower edge 5 by which the pot 1 is supported on a base surface, said lower edge 5 defining a foot 11 for the pot 1 (shown in FIG. 5). The bottom 2 comprises a flat, circular lower area in which nine openings 6 are provided. The number and the shape of the openings may of course be varied. Located on the inside of the lower area is an angled zone joining a central indentation 7. Furthermore, at the level of the upper edge 3, the sidewall 4 is provided with an outwardly protruding lip 8.

Such a pot 1 is integrally manufactured by means of injection molding from a transparent plastic, in particular a thermoplastic. Due to the pots being transparent, not only the roots coming out of the pot, but also part of the roots that are inside the pot receive light. The growth of the roots is favorably influenced by the light they receive. Furthermore, the integral manufacturing of the pot 1 ensures sufficient sturdiness and a quick production, wherein multiple, for instance 10 to 20, pots can be manufactured per minute.

As shown in the figures, the pot 1 has a long diagonal that decreases toward the bottom the pot 1, in other words: the pot 1 has a downward tapering shape. This allows the pots 1 to be nested, which yields a considerable saving of space during transport of the pots 1 from there place of manufacture to the location where they are to be used.

In the embodiment shown the bottom 2 is raised in relation to the lower edge 5, causing the lower edge 5 to constitute a foot 11 for the pot 1, which foot 11 joins the sidewall 4 by means of a collar 12. However, in other embodiments it is also possible for the bottom 2 to be directly supported on the base surface, with the lower edge 5 then constituting the joining between the bottom 2 and the sidewall 4. In such an embodiment, no separate foot 11 is provided for the pot 1.

Figure 2:
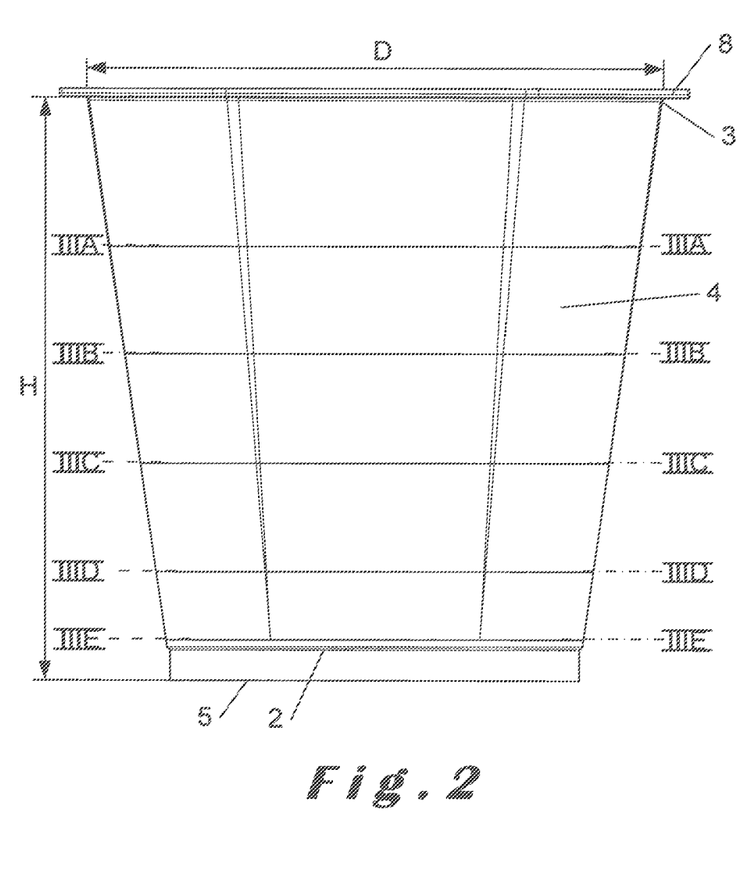
FIG. 2 shows a side view of the pot of FIG. 1.

The pot 1 has a height H measured between the lower edge 5 and the upper edge 3 and a maximum long diagonal D, both of which are indicated in FIG. 2. The height H is at most 20%, preferably at most 15% and more preferably at most 10% larger than the maximum long diagonal D. It is, in other words, a pot in which the epiphyte is planted, and not a vase in which such a pot, for instance in a later phase of the cultivation, is placed to prevent the leaves, and especially the aerial roots of adjacent epiphytes from growing together.

Figure 3A:
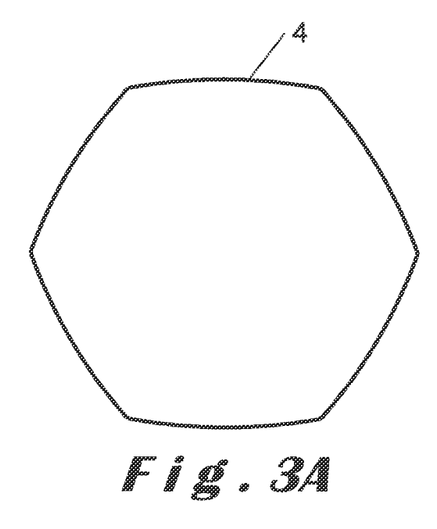
FIGS. 3A through 3E show a cross section along the lines A through E indicated in FIG. 2.
Figure 3B:
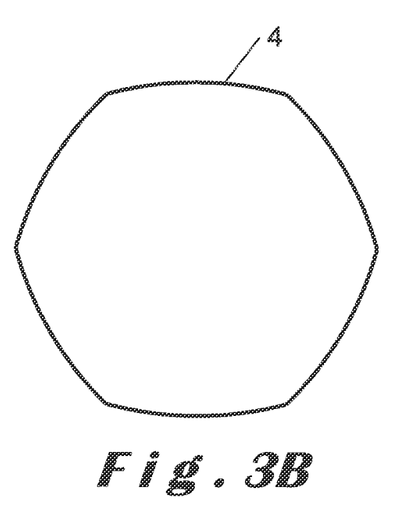
Figure 3C:
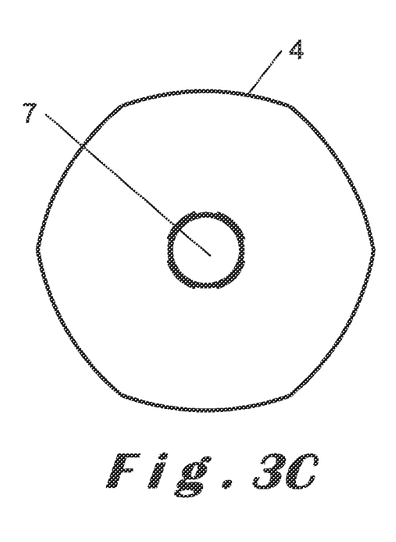
Figure 3D:
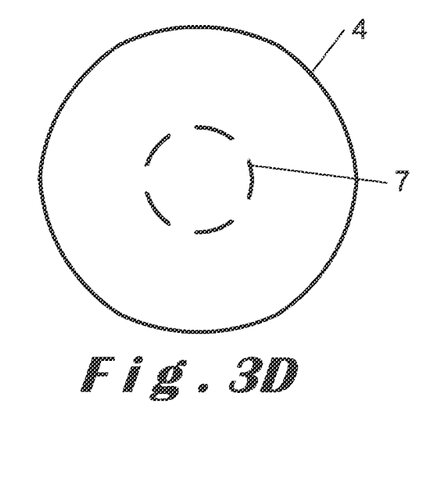
Figure 3E:
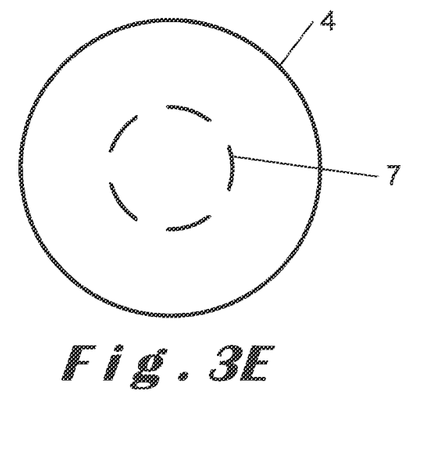
Figure 4:
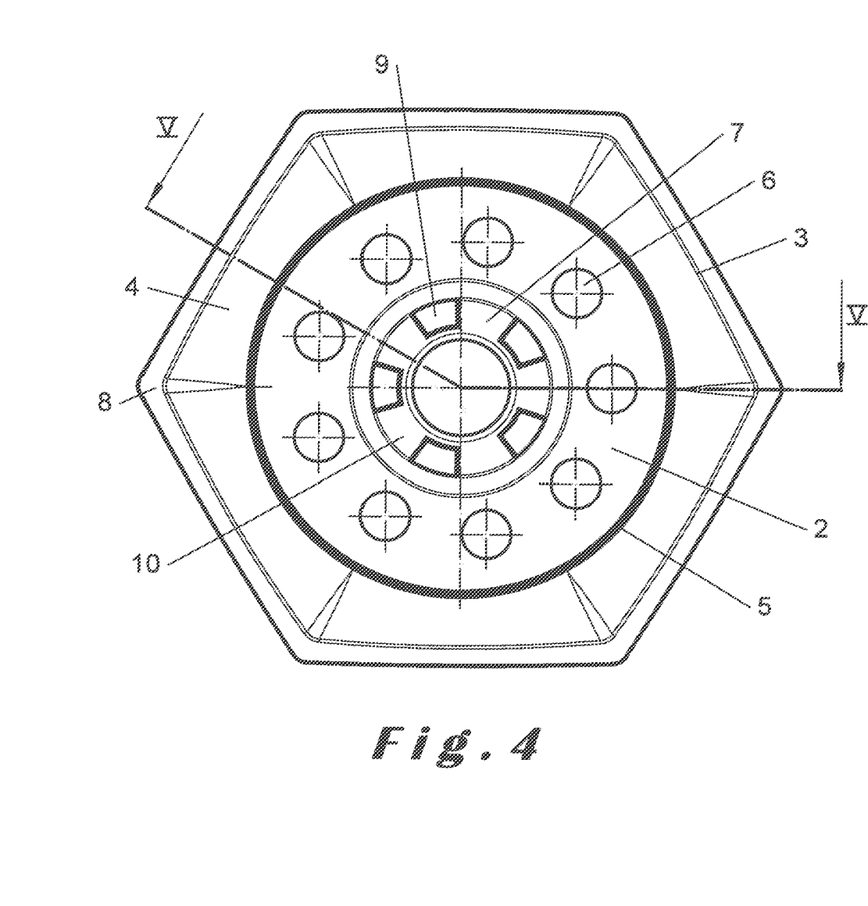
FIG. 4 shows a view from below of the pot of FIG. 1.

FIG. 4 illustrates the shape of the sidewall 4 of the pot 1. It is clear that the upper edge 3 has a substantially hexagonal shape with rounded corners, while the lower edge 5 (also including the joining of the bottom 2 with the sidewall 4 as shown in FIG. 3E) has a round shape. This allows, as already described above, more pots to be placed per unit area, both during the first phase of the cultivation and during transport.

By way of illustration, in the first phase of the cultivation in a greenery, tables are used on which the epiphytes are cultured. These tables are for instance sized at 6071 mm by 1624 mm. A round pot with an outer diameter of 115 mm in the first phase of cultivation yields a loading of 927 pots. A pot according to the disclosure with a hexagonal shape having an identical circumscribed diameter of 115 mm, on an identical table of 6071 mm by 1624 mm, in the first phase of cultivation yields a loading of 1136 pots. In other words, the modified shape allows 22.55% more epiphytes to be placed on a same surface area.

By way of illustration, during transport from the greenery to the store, Danish trolleys are used in the majority of cases.

These trolleys can be composed of multiple levels. Each level is sized at 1260 mm by 565 mm. Epiphytes are usually transported in carrying trays, which come in different sizes. A common size is 210 mm by 565 mm, of which 6 fit on one level of a Danish trolley. A round pot with an outer diameter of 115 mm in this size of carrying tray yields a loading of at most 60 pots on one level of a Danish trolley, namely, 6 trays of 10 pots. A pot according to the disclosure with a hexagonal shape having an identical circumscribed diameter of 115 mm, in a modified carrying tray (i.e. a carrying tray arranged for carrying pots according to the disclosure) yields a loading of at least 70 pots on one level of a Danish trolley, namely, 7 trays of 10 pots. In other words, the modified shape allows at least 16.7% more epiphytes to be placed on a same surface area during transport.

Although the upper edge 3 in the embodiment shown has a substantially regular hexagonal shape, the disclosure is not limited thereto. Indeed, the shape may deviate from a regular hexagon. To describe these possible deviations, a comparison will be made to a fictitiously defined hexagon. This fictitious hexagon has six vertices, with each of the vertices being defined by the point located farthest from the opposite corner, and with each side connecting two respective adjacent vertices with a straight line.

The fictitious hexagon may be regular, as in the embodiment shown. However, the sides of the fictitious hexagon may also each have a length that differs at most 5%, preferably at most 4%, more preferably at most 3% and most preferably at most 2% from the average lengths of the six sides. Due to the hexagon being substantially regular, no specific orientation of it needs to be kept in mind when positioning the pot 1.

Alternatively, the fictitious hexagon may have an elongated shape, wherein two pairs of opposing sides of the fictitious hexagon each have a length that differs at most 5%, preferably at most 4%, more preferably at most 3% and most preferably at most 2% from the average lengths of these two pairs of opposing sides, wherein the third pair of opposing sides have an average length that is longer than the average length of said two pairs of opposing sides, and wherein each of the sides of said third pair of opposing sides has a length that differs at most 5%, preferably at most 4%, more preferably at most 3% and most preferably at most 2% from the average length of the third pair of opposing sides. Such an elongated hexagonal shape offers the advantage that the epiphyte can be planted with its opposing leaves in the lengthwise direction of the elongated hexagon, allowing the plants to be placed closer together laterally.

However, due to the smaller volume of the pot 1 that can thus be placed in a round cache-pot, in an embodiment, the elongated hexagon is not too elongated and the average length of the sides of said third pair of opposing sides is at most 30%, preferably at most 20% longer than the average length of the sides of said two pairs of opposing sides.

According to the disclosure, the upper edge 3 of the pot 1 has a hexagonal shape with a surface area that is at most 9% larger, preferably at most 7%, more preferably at most 5% and most preferably at most 3% larger than the surface area of the fictitious hexagon. In the illustrated embodiment, the hexagonal is shape 2.8% larger than the fictitious hexagon. Hence, the pot 1 slightly differs from the fictitious hexagon determined by the vertices, with a small difference of for instance at least 1 or 2% being suitable, to thus create a positive strain onto the sides of the hexagonal cross section. This positive strain ensures that the hexagonal shape can be less easily compressed when taking hold of the pot 1.

FIGS. 3A through 3E show cross sections through the pot 1 at different heights, in particular along the lines A through E indicated in FIG. 2. These figures illustrate the changing of the shape of the sidewall in function of the height, and illustrate the gradual transition from the hexagonal shape near the upper edge 3 to the circular shape at the level of the joining of the bottom 2 to the sidewall 4 as shown in FIG. 3E.

Providing a circular join near the bottom 2 is primarily advantageous for the roots of the orchid. In the case of a circular shape, there are no corners which the roots could run into, and as a consequence, fewer roots will grow out of the pot. Moreover, the circular shape also offers the advantage that the pot can be gripped more sturdily at the bottom compared to an angular shape. It is also advantageous to use a circular shape because, as described above, it causes fewer difficulties in providing a transport system to convey the pot 1 through the greenery.

Although the joining of the bottom 2 to the sidewall 4 in the embodiment shown forms a circle, the disclosure is not limited thereto. The joining can also have a round shape that differs from a circle. To describe these possible deviations, a comparison will be made with a fictitiously defined circle. This fictitious circle is formed by the smallest circumscribing circle of the cross section at the level of the joining of the bottom 2 to the sidewall 4.

According to the disclosure, the joining of the bottom 2 to the sidewall 4 of the pot 1 has a round shape with a surface area that is at most 5% smaller than, preferably at most 4%, more preferably at most 3%, even more preferably at most 2% and most preferably at most 1% smaller than the surface area of the fictitious circle. Thus, the pot 1 may deviate to a certain extent from of the fictitious circle.

It should also be clear that other geometrical shapes are possible for the joining of the bottom 2 to the sidewall 4. Examples are, among others, elliptical, hexagonal, octagonal, square, etc. As long as the shape of the joining of the bottom 2 to the sidewall 4 fits within the shape of the upper edge 3 of the pot 1, which is also a necessary condition for the nestability of the pots 1, the main effect of the disclosure, i.e. the ability to arrange more pots per unit area, is achieved.

As can be seen in FIGS. 3A through 3E, there is a continuous and gradual transition from the hexagonal shape of the upper edge 3 to the round shape of the joining of the bottom 2 to the sidewall 4. This continuous transition is due to the sides, i.e. the connections between vertices, being curved with a curvature that increases, preferably linearly, toward the bottom the pot 1, wherein the sides preferably form an arc of a circle. Every two sides are connected by a curved corner, wherein the radius of curvature is substantially constant over the entire height of the pot 1. Preferably, the corners form an arc of a circle. As shown, all of the curves, both those of the sides as those of the vertices, are seamlessly joined.

The continuous transition, i.e. the transition without sudden jumps, allows the volume of the pot to be kept as large as possible and also, simultaneously, allows the sturdiness of the lower part of the pot to be kept as high as possible. The seamless join of the different curves also causes the hexagonal shape still present in the lower part of the pot to be less noticeable.

Moreover, such a design also results in the radius of the pot 1 decreasing linearly, again for maximizing the volume of the pot 1. The linear decrease is particularly clearly visible in the longitudinal cross section of FIG. 5 according to line V indicated in FIG. 4. It is clear that a longitudinal cross section through the sidewall 4 nearly everywhere (except near the bottom 2 of the pot 1) yields a straight line, albeit with different angles of inclination depending on the axial orientation of the longitudinal cross section.

Although the upper edge 3 in the embodiment shown has a substantially regular hexagonal shape, the disclosure is not limited thereto. The fact is that the shape may also be octagonal. An octagonal shape still yields a gain of unit surface area compared to a round shape, albeit a smaller gain compared to a hexagonal shape as described above. Preferably, the upper edge 3 in such an embodiment takes the shape of a substantially regular octagon, although one or more pairs of opposing sides may also be longer or shorter compared to the rest of the opposing sides, so that an elongated octagonal shape is also possible. Moreover, it is also possible, like in the case of the hexagonal shape shown, for the sides of the octagon to be curved and/or for the corners to be rounded.

It should be clear from the above that the design of the indentation 7 is of secondary importance to the present disclosure. It is, however, preferable, as in the illustrated embodiment, for an indentation 7 as described in the patent NL 2013977 to be used. In particular, the indentation 7 is provided with a number of air channels 9 and an upwardly facing air vent 10 leading into the interior of the pot 1. The air channel 9 provided in the pot 1 allows the cube, i.e. the young plant, to exchange moisture with the surrounding atmosphere more directly, resulting in a noticeably quicker drying of the cube after watering. This proved to offer the advantage of keeping the roots healthy and at the same time yielding a good root development.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claimed are defined as follows:

1. A pot for culturing an epiphyte, the pot being integrally injection molded from a transparent plastic, the pot comprising:
 a bottom;
 a lower edge arranged to be supported on a base surface;
 an upper edge; and
 a sidewall extending between the lower edge and the upper edge and having an outwardly protruding lip at the level of the upper edge, the bottom joined to the sidewall,
 wherein the pot has a height, measured between the lower edge and the upper edge in a direction perpendicular to the base surface, and a maximum long diagonal, the height being at most 20% larger than the maximum long diagonal,
 wherein an upper cross section through the sidewall of the pot, according to a first cross-sectional plane parallel to the base surface and tangent to the lower face of the protruding lip, has a substantially polygonal shape,
 wherein a lower cross section through the sidewall, according to a second cross-sectional plane parallel to the base surface and tangent to the upper face of the joining of the bottom to the sidewall, has a substantially round shape, and
 wherein the shape of the cross sections of the sidewall, according to cross-sectional planes located one below the other parallel to the base surface, continuously transitions, over the majority of the distance between the first and the second cross-sectional plane, from the substantially polygonal shape to the substantially round shape.

2. The pot of claim 1, wherein the upper cross section has a substantially hexagonal shape.

3. The pot of claim 2, wherein the upper cross section has six vertices which are each defined in one of six corners of the upper cross section by a point of the upper cross section which is located farthest from the opposite corner, and wherein the six vertices define a fictitious hexagon.

4. The pot of claim 3, wherein the fictitious hexagon has a first surface area, and the upper cross section has a second surface area that is at most 9% larger than the first surface area.

5. The pot of claim 4, wherein the second surface area is at most 7% larger than the first surface area.

6. The pot of claim 3, wherein the sides of the fictitious hexagon each have a length that differs at most 5% from the average length of the six sides such that the fictitious hexagon is substantially regular.

7. The pot of claim 3, wherein the fictitious hexagon is substantially elongated, wherein two pairs of opposing sides of the hexagon each have a length that differs at most 5% from the average lengths of the two pairs of opposing sides, wherein the third pair of opposing sides have an average length that is longer than the average length of the two pairs of opposing sides, and wherein each of the sides of the third pair of opposing sides has a length that differs at most 5% from the average length of the third pair of opposing sides.

8. The pot of claim 7, wherein the average length of the sides of the third pair of opposing sides is at most 30% longer than the average length of the sides of the two pairs of opposing sides.

9. The pot of claim 1, wherein the smallest circle encircling the lower cross section has a third surface area and the lower cross section has a fourth surface area that is at most 5% smaller than the third surface area.

10. The pot of claim 9, wherein the fourth surface area is at most 4% smaller than the third surface area.

11. The pot of claim 1, wherein the shape of the cross section of the sidewall continuously transitions, over at least 70% of the distance between the first and the second cross-sectional plane, from the substantially polygonal shape to the substantially round shape.

12. The pot of claim 1, wherein the shape of the cross sections of the sidewall continuously transitions from the substantially polygonal shape to the substantially round shape due to the cross sections having curved sides with a curvature that increases toward the lower cross section.

13. The pot of claim 12, wherein the sides substantially constitute an arc of a circle having a radius of curvature that decreases toward the lower cross section.

14. The pot of claim 1, wherein the cross sections have rounded corners.

15. The pot of claim 14, wherein the rounded corners are rounded according to an arc of a circle having a radius of curvature that is substantially constant, wherein the length of the circle arcs of the rounded corners decreases toward the lower cross section.

16. The pot of claim 15, wherein the cross sections have curved sides and the circle arcs of the rounded corners have ends that are aligned with the adjoining ends of the curved sides of the cross sections.

17. The pot of claim 16, wherein the curved sides substantially constitute an arc of a circle having a radius of curvature that decreases continuously toward the lower cross section.

18. The pot of claim 1, wherein the pot has a long diagonal that decreases linearly from the upper cross section down to a distance of at most 10% of the height of the pot above the lower cross section.

19. The pot of claim 1, wherein the sidewall is free of any collar between the upper cross section and a cross section located at 10% of the height of the pot above the lower cross section.

20. The pot of claim 1, wherein the pot is provided at the bottom with a foot that extends vertically and transitions through a collar, into the sidewall.

21. A potted orchid, planted in a pot having a growing substrate therein, wherein the pot comprises a pot according to claim 1.

22. The pot of claim 1, wherein the upper cross section has a substantially octagonal shape.

* * * * *